(12) United States Patent
Varekamp et al.

(10) Patent No.: US 12,106,521 B2
(45) Date of Patent: Oct. 1, 2024

(54) METHOD OF CALIBRATING CAMERAS

(71) Applicant: KONINKLIJKE PHILIPS N.V., Eindhoven (NL)

(72) Inventors: Christiaan Varekamp, Veldhoven (NL); Bart Kroon, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 165 days.

(21) Appl. No.: 17/921,998

(22) PCT Filed: Apr. 23, 2021

(86) PCT No.: PCT/EP2021/060613
§ 371 (c)(1),
(2) Date: Oct. 28, 2022

(87) PCT Pub. No.: WO2021/219496
PCT Pub. Date: Nov. 4, 2021

(65) Prior Publication Data
US 2023/0162398 A1 May 25, 2023

(30) Foreign Application Priority Data

May 1, 2020 (EP) .................................. 20172598

(51) Int. Cl.
*H04N 13/128* (2018.01)
*G06T 7/80* (2017.01)
(Continued)

(52) U.S. Cl.
CPC ............. *G06T 7/85* (2017.01); *H04N 13/117* (2018.05); *H04N 13/128* (2018.05);
(Continued)

(58) Field of Classification Search
CPC ...... G06T 7/85; H04N 13/128; H04N 13/246; H04N 13/117
(Continued)

(56) References Cited

U.S. PATENT DOCUMENTS

| 6,208,386 B1 | 3/2001 | Wilf et al. |
| 7,733,495 B2 | 6/2010 | Dyke et al. |
| 2003/0210329 A1 | 11/2003 | Aagaard et al. |

FOREIGN PATENT DOCUMENTS

| EP | 0848884 | 3/1997 |
| WO | 9709823 A1 | 3/1997 |

OTHER PUBLICATIONS

International Search Report and Written Opinion from PCT/EP2021/060613 mailed Nov. 4, 2021.
(Continued)

*Primary Examiner* — Nguyen T Truong

(57) ABSTRACT

A method for calibrating at least one of the six-degrees-of-freedom of all or part of cameras in a formation positioned for scene capturing, the method comprising a step of initial calibration before the scene capturing. The step comprises creating a reference video frame which comprises a reference image of a stationary reference object. During scene capturing the method further comprises a step of further calibration wherein the position of the reference image of the stationary reference object within a captured scene video frame is compared to the position of the reference image of the stationary reference object within the reference video frame, and a step adapting the at least one of the six-degrees-of-freedom of a multiple cameras of the formation if needed in order to get an improved scene capturing after the further calibration.

20 Claims, 7 Drawing Sheets

(51) Int. Cl.
*H04N 13/117* (2018.01)
*H04N 13/246* (2018.01)
*H04N 13/00* (2018.01)

(52) U.S. Cl.
CPC . *H04N 13/246* (2018.05); *G06T 2207/10021* (2013.01); *G06T 2207/30228* (2013.01); *H04N 2013/0096* (2013.01)

(58) Field of Classification Search
USPC .......................................................... 348/48
See application file for complete search history.

(56) References Cited

OTHER PUBLICATIONS https://en.wikipedia.org/wiki/True_range_multilateration downloaded Sep. 19, 2022.
https://en.wikipedia.org/wiki/Perspective-n-Point downloaded Sep. 19, 2022.
https://en.wikipedia.org/wiki/Structure_from_Motion downloaded Sep. 19, 2022.
https://en.wikipedia.org/wiki/Bundle_adjustment downloaded Sep. 19, 2022.
https://en.wikipedia.org/wiki/Kabsch_algorithm downloaded Sep. 19, 2022.
https://en.wikipedia.org/wiki/Kalman_filter downloaded Sep. 19, 2022.

METHOD OF CALIBRATING CAMERAS

CROSS-REFERENCE TO PRIOR APPLICATIONS

This application is the U.S. National Phase application under 35 U.S.C. § 371 of International Application No. PCT/EP2021/060613, filed on Apr. 23, 2021, which claims the benefit of EP Patent Application No. EP 20172598.3, filed on May 1, 2020. These applications are hereby incorporated by reference herein.

The invention relates to a method for calibrating at least one of the six-degrees-of-freedom of all or part of cameras in a formation positioned for scene capturing, the method comprising a step of initial calibration before the scene capturing, wherein the step comprises creating a reference video frame which comprises a reference image of a stationary reference object, and wherein during scene capturing the method further comprises:

- a step of further calibration wherein the position of the reference image of the stationary reference object within a captured scene video frame is compared to the position of the reference image of the stationary reference object within the reference video frame, and
- a step of adapting the at least one of the six-degrees-of-freedom of a multiple cameras of the formation in order to get an improved scene capturing after the further calibration.

In the present patent application the term six-degrees-of-freedom relates to the three possible translational movements of the camera positions and the three possible rotational movements. It is emphasized that in the present patent application a degree-of-freedom of a camera is not only intended to cover a physical translational or rotational movement of the camera but also to a virtual translational or rotational movement of the camera whereby thus the camera is not translated or rotated but that in stead a similar action (with similar results) is performed on the image generated by the camera. Thus in case of a virtual (electronic, digital) control of a camera, adaptation of a six-degrees-of-freedom of a camera is actually adaptation of one or more of the three possible camera position parameters and/or one or more of the three possible rotation parameters. The image acquired by a given camera can for instance be spatially transformed such that it corresponds to a virtual camera that is slightly rotated compared with the physical camera. This concept is also relevant in view of virtual view synthesis and keeping a camera calibrated. A combination of both physical and virtual movements is also not excluded, e.g. a physical translational movement and a virtual rotational movement.

The invention also relates to a formation of cameras and a computer program, related to above method of calibration.

In the prior art a formation of cameras is known, e.g. a rig on which 8 cameras are mounted. This can be used in various applications for instance in virtual and/or augmented reality recording systems, generally denoted as VR/AR applications. Such a VR/AR device can be stationary positioned or may be (hand-held) portable. The cameras on such a device are usually pre-calibrated in a factory (or laboratory) on certain parameters, for instance on the focal length of the lens. These parameters are thereafter generally fixed and need not be calibrated anymore by the user of the VR/AR device. However before actual use the user generally has to carry out an initial calibration which is related to the actual scene set-up. Hereby one or more of the six-degrees-of-freedom of the cameras are adapted if needed. Thereafter the VR/AR device is ready for starting scene recordings. It is of utmost importance that during recording any degree of freedom is only changed when desired, thus when the cameras are e.g. rotated to another part of the scene. Thus during recording the translational or rotational movements of the cameras may not be (significantly) disturbed since otherwise accurate VR/AR recording may then be inhibited with annoying artefacts. Usually the rigs are relatively small with relative low number of cameras and recording is in most situations inside a house or building or the like and thus disturbances can be for the greater part avoided. However, in especially portable devices, the chance on such disturbances is higher. Of course this problem gets bigger in situations where the device is situated outside and is thus subject to vibrations caused by passing trucks or by the wind etc. The problem gets even more problematic in case where a large formation of cameras is needed, e.g. in a sports stadium like e.g. a soccer stadium. This is because distance between cameras will generally be larger and cameras are often no longer physically connected by a rigid structure. For instance, for small camera rigs (small 3D look-around effects) the cameras can be fix-mounted at a separation of e.g. 5 cm onto an aluminum bar of thickness 30 mm×8 mm. However, this is generally not possible outdoors and the cameras might be mounted meters apart on existing infrastructure with unknown mechanical properties. This is because then a very small deviation of a camera position or orientation can already give a noticeable artefact.

It is an object of the invention to overcome or to at least diminish the influence of disturbances of the cameras during scene recording.

In accordance with a first embodiment of the invention the method is characterized as defined in the characterizing portion of claim 1. An advantage is that if one or more of the cameras has become (too much) uncalibrated it is possible to then immediately start an "online" further calibration so that recording of the scene should not be interrupted in order to repeat the initial calibration similar as performed during the set up before the start of the scene recording. Another advantage is that the further calibration can be timely done before a disturbance on the camera would be large enough to cause substantial annoying artefacts. Although it is preferred that all cameras create a reference video frame comprising a reference image of the stationary reference object, it is also possible that only a part of the cameras do so.

If the further calibration is performed by virtual control of a camera, thus by virtual adapting a degree-of-freedom of a camera that is to say that the reference image of the stationary reference object within a captured scene video frame is transformed back to the same position&orientation as in the reference video frame, then the further calibration has yet another advantage in that such calibration can be more quickly carried out than in case the further calibration is carried out by mechanical control of the cameras. (Electronic control is usually quicker than mechanical control.) To avoid unwanted outer areas in the (adapted) calibrated video frame, re-scaling&cropping of the video frame may be performed. The technique of re-scaling&cropping is long time known and is for instance described in patent U.S. Pat. No. 7,733,405B2, dated 8 Jun. 2010, by Van Dyke et al.

If the further calibration is performed by mechanical control of a camera then this has the advantage that above mentioned re-scaling&cropping techniques are not necessary. A further advantage of mechanical control is that the range of calibration can be larger than in case of electronic control. In principal separate (additional) servos can be applied for the mechanical control but the mechanical control can also be carried out by the usually already available servos intended for regular camera control.

Of course, in correspondence with the earlier definition of what is intended with a degree-of-freedom of a camera, also the adaptation of the cameras is intended to cover a physical and/or a virtual adaptation. The result of step B can also be that more than one of the six-degrees-of-freedom is adapted. For instance adaption of a camera in a side direction and adaptation in both yaw and roll. The values in step C may also comprise a sign (positive or negative) so that for instance in above mentioned example it is clear whether the side direction is in a left or horizontal defined direction. The timestamps in step C don't need to refer to a realistic time such as a national local time or a Greenwhich Mean Time. Time stamps are only needed relative to any (freely) determined time. The classification of the different root causes for camera disturbances is a very valuable feature of the invention. These root causes can be logged and this logging can (later) be used to learn how to improve the position of the cameras in the formation or where to better position the complete formation, etc.

In accordance with a second embodiment of the invention the method is characterized as defined in the characterizing portion of claim 2. The advantage is that it is then additionally also possible to distinguish a one-time or low-frequency disturbance of a particular route cause.

In accordance with a third and fourth embodiment of the invention the method is characterized as defined in respectively the third and fourth characterizing portion of claims 3 and 4. This is beneficial in case that not all degrees-of-freedom need to be adaptable for making corrections. It can for instance be that in particular settings disturbances are mainly causing deviations in orientations of the cameras. The advantage is quicker and easier control of cameras adaptation and a reduced amount of data which is especially advantageous in case data is for instance transferred to a client system.

In accordance with a fifth embodiment of the invention the method is characterized as defined in the characterizing portion of claim 5. This has the advantage that no unnecessary further calibration is executed when for instance an orientation deviation of a camera is so small that it would not lead to a noticeable artefact in the image.

In accordance with a sixth embodiment of the invention the method is characterized as defined in the characterizing portion of claim 6. This is especially advantageous in case the formation comprises a large amount of cameras (e.g. >50). One could then for instance decide that for the second part of the cameras that would need corrections by means of the further calibration (translational and/or rotational adaptions) to not calibrate them with the said further calibration but instead use the information from close (but not necessarily direct) neighboring cameras to carry out the needed corrections. This has the advantage of increase (total) calibration speed of the formation of cameras and a reduced amount of data which is especially advantageous in case data is for instance transferred to a client system. Consider for instance a camera array consisting of 100 cameras distributed over the 4 sides of a rectangular sports field. After an initial calibration of all cameras has been performed all 100 cameras can be monitored by selecting two end-point cameras per side (8 cameras in total). If for one side one of the two monitoring cameras is no longer calibrated all intermediate cameras can be compared with this camera and re-calibrated based on the differences.

A seventh and eight embodiment of the invention is characterized as defined in the characterizing portions of respectively claims 7 and 8. The more even the distribution is, the more accurate is the recording. In most cases it will be sufficient to use interpolation techniques but, especially near an end point of the formation, it may be advantageous to also apply extrapolation techniques.

It is to be emphasized however that if the alternative calibration is not applied (and thus in stead the further calibration is applied) that then the best recording quality can be expected.

In accordance with a ninth embodiment of the invention the method is characterized in that the initial calibration is continuously repeated autonomously or at a specific event. Although in principal the initial calibration should be avoided as much as possible (preferably it is only carried out once before scene recording) it can sometimes occur that calibration by only the further calibration and/or the alternative calibration is no longer sufficient. This is when a camera becomes too much out of calibration. This event can be detected manually or automatically. A natural break in e.g. the soccer game is also a good moment to carry out an initial calibration. However in order to try to avoid such an occurrence (or event) the initial calibration can also be continuously repeated, preferably autonomously, with a low repetition frequency. It can for instance be that a reference video frame must be updated because the stationary reference object gradually changed as time passed by, e.g. by changing light circumstances causing shadows over the stationary object.

In accordance with the invention a formation of cameras is defined in claim 10 which is in correspondence with claim 1. It is emphasized that also other disclosed methods of the invention, especially the ones defined in claims 2-9, can be advantageously applied in the formation of cameras.

The invention further comprises a computer program comprising computer program code means adapted, when said computer program is run on a computer, to implement any method of the invention, especially the ones defined in claims 1-9.

For a better understanding of the invention, and to show more clearly how it may be carried into effect, reference will now be made, by way of example only, to the accompanying drawings, in which.

THE INVENTION WILL BE DESCRIBED WITH REFERENCE TO THE FIGURES

It should be understood that the detailed description and specific examples are intended for illustration only and are not intended to limit the scope of the invention. These aspects and advantages will become better understood from the following description, appended claims, and accompanying drawings.

Figure 1:
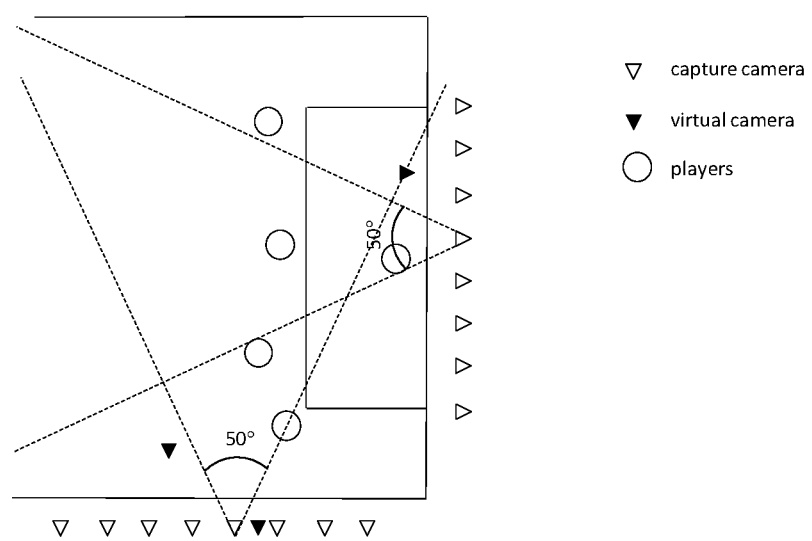
FIG. 1 shows two linear arrays of 8 cameras each placed along the sides of a soccer field.

FIG. 1 shows a formation of cameras having two linear arrays of 8 cameras each placed along the sides of a soccer field. Capture cameras (thus physically present cameras) are represented by open triangles. Virtual cameras are indicated by filled triangles. The virtual cameras are physically non-existing and are only created by and existing in electronics&software. After calibration and depth estimation, virtual views may be synthesized for positions in between capture cameras or even for positions moving forward into the player field. In many cases, especially on a large sport field as a soccerfield many more cameras may be applied, e.g. 200 cameras. The cameras need not be aligned in a (virtual) straight line. For instance it can be advantageous to place a formation of cameras along a complete side of the soccerfield whereby the cameras nearby the edges (closer to the left/right goals) of the formation of cameras are portioned closer to the middle of the player field and are also more orientated in the direction of the middle of the player field. The formation can of course also be completely around the player field. Also the formation may actually be split up in several formations. For example FIG. 1 shows actually two formations of 8 cameras.

Figure 2:
FIG. 2 shows example images for most left and most right cameras in an array of eight cameras as seen from the side of the soccer player field.
Figure 2:

FIG. 2 shows example images captured by the left most camera and the right most camera in an 8-camera long linear array that is positioned along the side of the soccer field. As can be seen the perspective with respect to the players changes considerably from camera 1 to camera 8. The borders that can be seen at the far end of the soccer field can be used to define useful image features for calibration. Thus this features can function as stationary objects for creating one or more reference video frames. For instance the checkered panels or the stairs in between the seats may be suited for this purpose.

Figure 3:
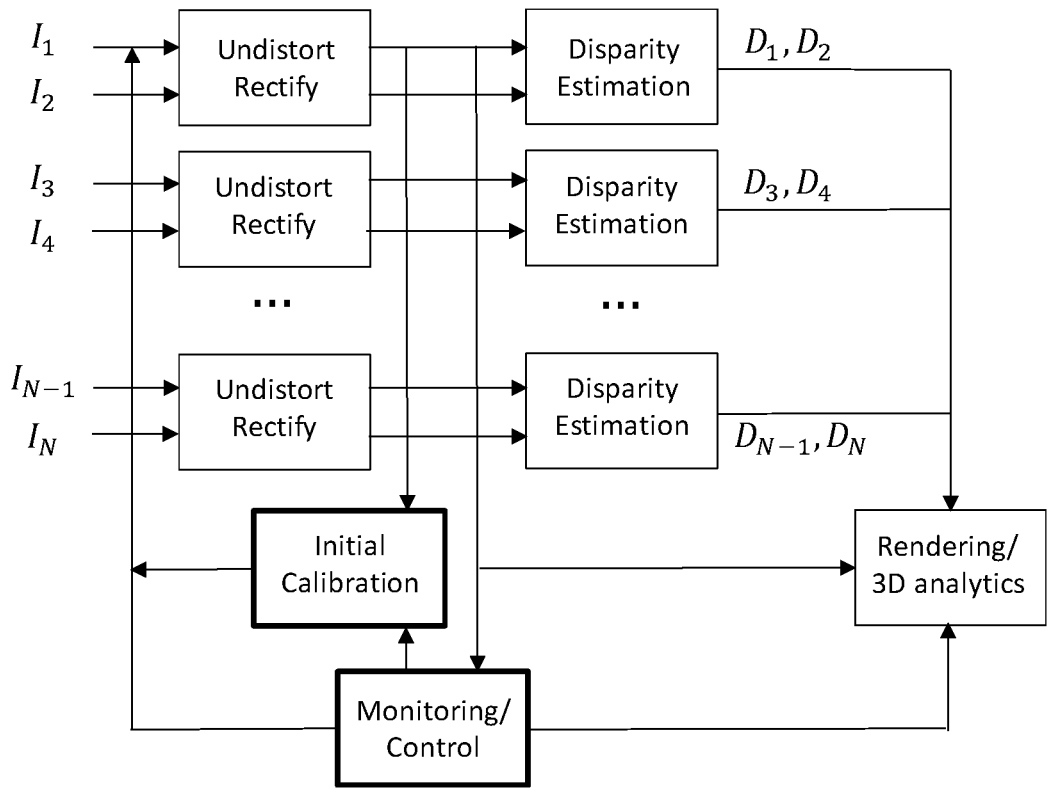
FIG. 3 shows a multi camera system for generating 3D data.

FIG. 3 shows a system diagram where the pairwise steps of image undistortion and rectification and disparity estimation depend on initial calibration and calibration monitoring and control which also comprises the further calibration. In view of simplicity there is only one "connection arrow" drawn from the upper "Undistort/Rectify block" to the "Initial Calibration block" and also only one "connection arrow" drawn from the "Initial Calibration block" to the upper "Undistort/Rectify block". It will however be apparent that these connections also exist with reference to all the other "Undistort/Rectify blocks".

Input in FIG. 3 are the N camera images 11 whereby i=1 ... N. These camera images are individually undistorted to compensate for lens distortions and focal length per camera. However, the same spatial remapping processes also rectifies each camera per camera pair. For instance, cameras 1 and 2 form the first pair in the array. Camera pairs are typically positioned spatially adjacent to each other in the array. The rectification step makes sure that, per pair, the input camera images are transformed such that they transform into a stereoscopic pair where the optical axis are aligned and rows in the image have the same position. This is essentially a rotation operation and commonly known as stereo rectification. The process is illustrated in FIG. 4.

The calibration process typically relies on a combination of the following known (see e.g. "Wikipedia") algorithms:
1. True-range multi-lateration to determine pose based on laser measurements;
2. Perspective N-point calibration combining N scene points with known 3D position;
3. Structure-from-motion with bundle adjustment.

After initial calibration at installation, the multi-camera system may be used for different purposes. For instance, depth estimation can be performed after which virtual views may be synthesized to allow AR/VR experiences for viewers of a match. However, the system may also be used to recognize the position of an object (e.g. the foot or knee of a player) at a given moment in time and determine the 3D position based on the multiple views. Note that for the latter application, two views would be enough in theory but having many viewpoints minimizes the chance of the object of interest being occluded.

Figure 4:
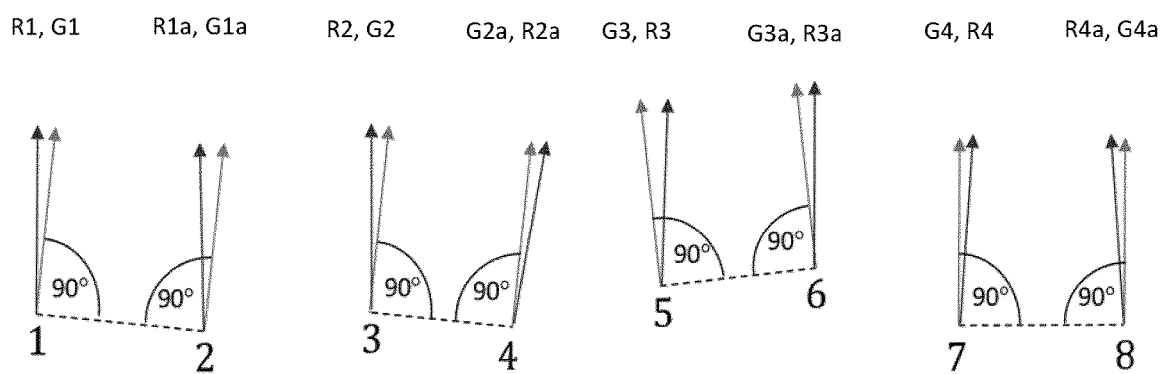
FIG. 4 shows pairwise rectification of cameras for an 8-camera linear array.

FIG. 4 shows pairwise rectification of cameras for an 8-camera linear array. The rectification transforms each image such that the optical axes, indicated with arrows (R1, R1a; R2, R2a; R3, R3a; R4, R4a) become pairwise parallel, indicated with arrows (G1, G1a; G2, G2a; G3, G3a; G4, G4a) and orthogonal to the line (dotted) that connects both cameras. The rectification allows for easier disparity estimation and depth calculation.

Figure 5:
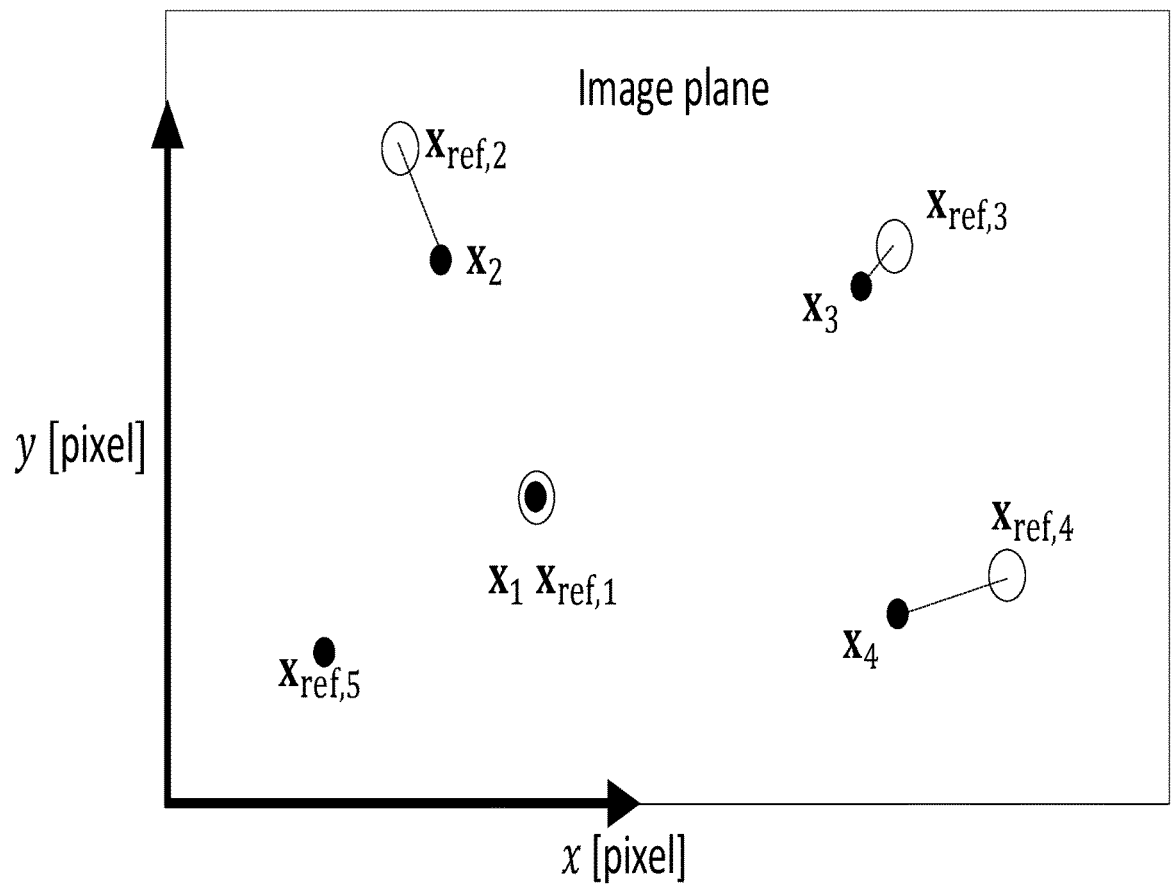
FIG. 5 shows schematically a set of reference feature points and a set of corresponding feature points in a 2D image plane.

FIG. 5 shows schematically a set of reference feature points and a set of corresponding feature points in a 2D image plane. The correspondence relation is determined via motion estimation and illustrated via the dotted line. As can be seen a corresponding point in a new frame cannot always be found since occlusion may occur or motion estimation may fail due to image noise.

Figure 6:
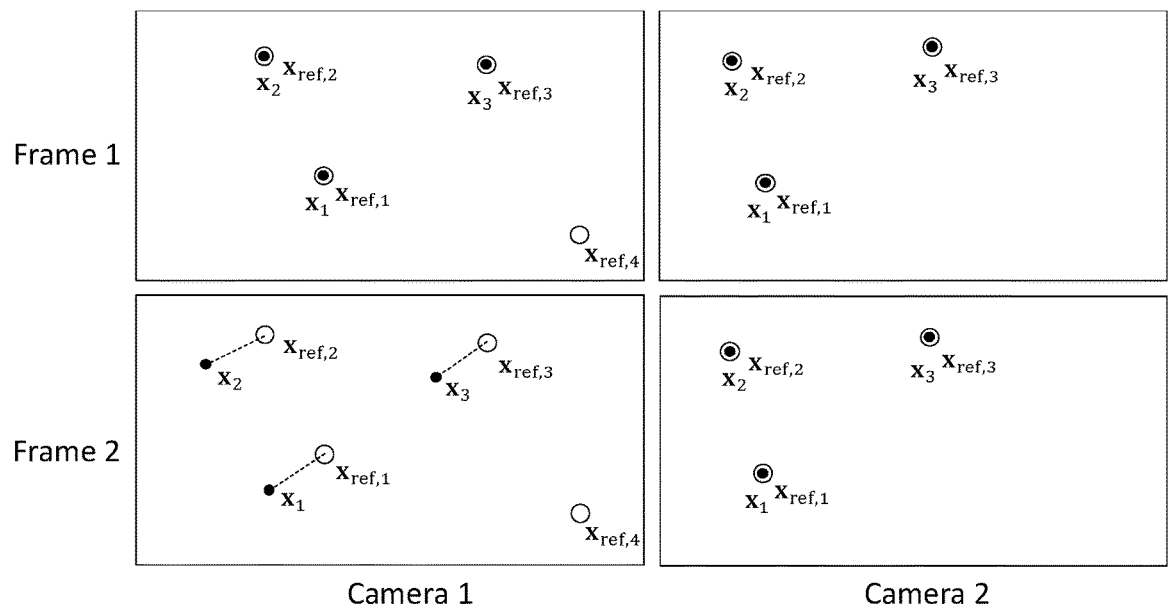
FIG. 6 shows a schematic illustration of calibration.

FIG. 6 shows a schematic illustration of calibration by showing an example of a changing camera (camera 1 in this case). Original features are detected in a reference frame and their image position is represened by open circles. Corresponding feature points are thereafter determined via motion estimation in a first frame and in a second frame. These corresponding points are represented as closed circles. As shown the points do not change position for frames 1 for both cameras 1 and 2 and for frame 2 for camera 2. However, for camera 1 points 1, 2 and 3 change position. It can therefore be concluded that camera 1 is no longer calibrated. Notice that for reference point 4 which is only visible in camera 1, a corresponding feature point was never found. This point is denoted to be 'invalid' and therefore not taken into account when calculating an error metric on the basis of which we conclude that a camera is no longer calibrated (see equation further on).

Thus the 3D scene points are first projected in a reference frame (represented by the open circles). Correspondence is estimated for these points with further frames (represented by closed circles) using image based matching. Calibration status for further frames is judged OK when a given fraction of corresponding feature points don't change position. This is the case for both camera 1 and camera 2 in frame 1. However, in frame 2, camera 1 shows a rotation error since three points are displaced compared to the reference points.

Figure 7:
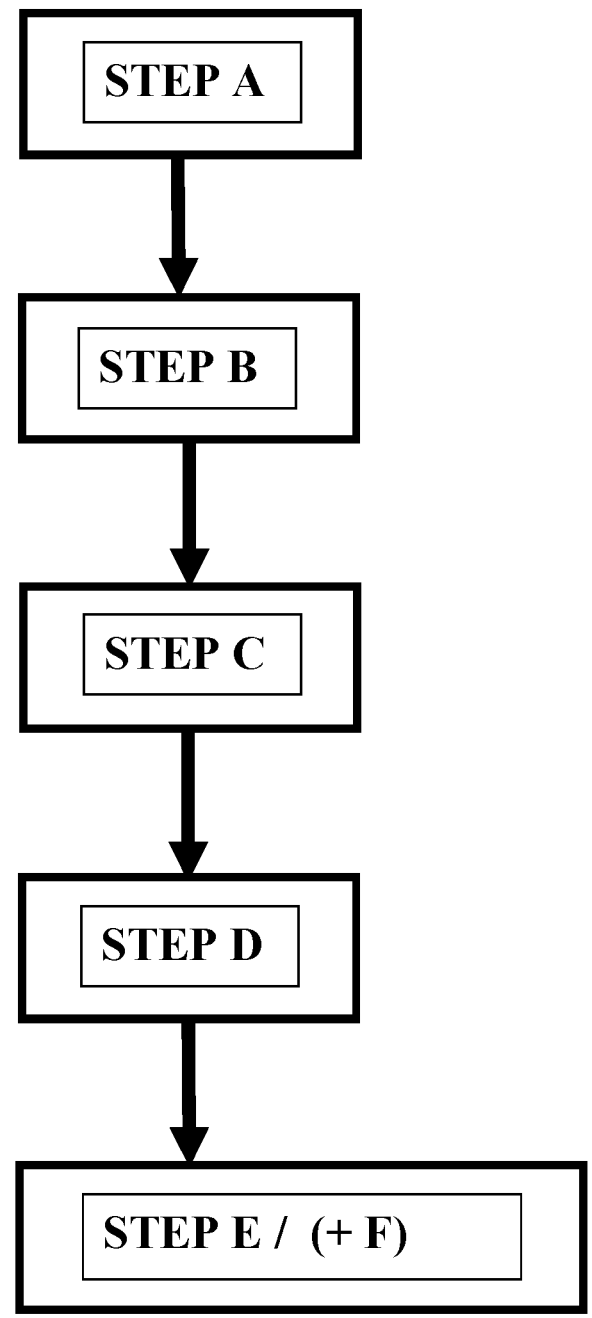
FIG. 7 shows method steps for classifying recognized multiple patterns for indicating different root causes of cameras getting uncalibrated.

FIG. 7 show the steps for classifying recognized patterns (in six-degrees-of-freedom disturbances of a camera) for indicating different root causes of cameras getting uncalibrated.

In step A it is analyzed which cameras of a formation of cameras have been adapted caused by an external disturbance, like e.g. wind.

In step B for each adapted camera it is analyzed which of the six-degrees-of-freedom is/are adapted. For instance in step A it has been determined that for a first camera only the orientational direction "yaw" has been adapted and for a second camera both orientational directions "Yaw" and "Roll" and the translational direction "left-right" have been adapted.

In step C the values and time stamps of the adaptions are determined. For instance for the said first camera the value of the "Yaw" is 0.01° and for the said second camera the value of the "Yaw" and "Roll" are respectively 0.01° and 0.02° and the value of "left-right" is +12 mm. (E.g. +12 mm is 12 mm to the right, while −12 mm would be 12 mm to the left.) The time stamps for both cameras is for instance 13:54 h+10 sec.+17 ms. (In principal the timestamps for both cameras may also differ.) Also with an orientation e.g. "Pitch" a sign can be dedicated to the value, e.g. −0.01° but alternatively also values of the angle could be indicated without a sign if full use is made of 360° representation that is to say−0.01° can also be indicated as +359.99°.

In step D multiple patterns along the formation of cameras are recognized along the formation of cameras by analyzing the information resulted from steps A, B, and C. E.g. with reference to a first timestamp all values of the adaptations related to "Yaw" are registered as a first pattern of camera deviations, all values of the adaptations related to "Roll" are registered as a second pattern of camera deviations, etc.

In step E the recognized multiple patterns are classified whereby the classification indicate different root causes for camera disturbances in one or more of the six-degrees-of-freedom of cameras in the formation. Examples for the classification are: "wind", "mechanical stress", "temperature effect", etc. These classifications are e.g. determined by knowledge resulted from earlier measurements. For example the said first pattern is compared with all possible classifications. It is not necessary that the first pattern has only a "hit" if the corresponding classification exactly matches, a high resemblance is sufficient. Use can be made of all kind of (known) pattern recognition methods. Of course if no "hit" at all is found then the pattern can be classified as "unknown cause"

Optionally in step F, step E takes multiple analyzing sessions of steps A, B, C, and D into account. This gives additional possibilities for classifying the patterns. E.g. if a calibration issue comes back regularly for example for only two cameras in a large formation of cameras, the classifier may then output: "recurring group disturbance".

A suitable error metric for detecting calibration problems is the sum of distances between corresponding positions for all valid feature points:

$$e \equiv \frac{1}{N_{valid}} \sum_{i=1}^{N_{valid}} \|x_{ref,i} - x_i\|$$

where $x_{ref,i}$ is the reference image feature point, $x_i$ is the matched image feature point and $N_{valid}$ is the number of features that is matched succesfully from the reference video frame to the new video frame. A simple test now evaluates:

$$e < T,$$

where T is a pre-set threshold [pixel]. This threshold is typically set to a magnitude between 0.1 and 5 pixel. Once the test fails, the status of the camera involved is set to 'uncalibrated'.

In case the calibration test fails for a single camera but not for the other cameras, it can be concluded that a local disturbance occurred only affecting a single camera. Under the (realistic) assumption that only camera orientation has changed the camera can be re-calibrated in real-time.

First, observe that the distance $r_i$ from the camera to each 3D scene point i must remain constant since neither the scene point nor the camera position change. The camera coordinates of point i can be calculated using:

$$z_{c,i} = \frac{fr_i}{\sqrt{u^2 + v^2 + f^2}}$$

$$x_{c,i} = \frac{uz_{c,i}}{f}$$

$$y_{c,i} = \frac{vz_{c,i}}{f}$$

where f is the focal length [pixel] and u, v are image coordinates [pixel]. This gives calibration points in both world space and camera space. The well-known Kabsch algorithm (see e.g. "Wikipedia") can then be used to estimate the rotation matrix that takes a point in world space and transforms it to camera space. The new rotation matrix is only accepted as part of an updated view matrix when after projection of the 3D scene points into the image the re-projection error e decreases. Note that even then, the camera status may still evaluate to 'uncalibrated'. This happens when e T.

It is also useful to detect a slowly changing trend in camera orientation. If such a trend is present then the root-cause is likely "mechanical stress or temperature" when the re-projection error e exceeds threshold T.

A linear array of five cameras can show the following spatial pattern of errors:

$$e_1 < T, e_2 < T, e_3 T, e_4 T, e_5 < T.$$

As can be seem, the problem is still localized (at cameras 3 and 4). It could still be the case that a "local disturbance" (close to cameras 3 and 4) causes the problem. Real-time re-calibration of both cameras is the sufficient action to take. If the problem comes back regularly for only these two cameras, the classifier will output: "recurring group disturbance". A suitable action is then to exclude the image data from these two cameras and base the view synthesis and/3D analysis on the other cameras that still have the calibrated status. It may be that a "recurring group disturbance" is related to a specific location in the stadium. By logging re-projection errors over an entire game it can be analyzed which spatial locations in the stadium systematically cause most instabilities. For a next match, cameras may be placed at a different location.

A strong wind, cheering people (stadium vibration) or a passing truck can change the orientation of cameras. These root-causes typically affect all cameras but may only have a temporary influence on the orientations of all cameras. It may be that these types of disturbances will temporarily increase the re-projection error for all cameras but that due to elasticity in the system the re-projection error will decrease again (e.g., when people have stopped cheering). In this situation where for all cameras the re-projection error passes the threshold by a small amount we can choose to take no action at all, i.e. we tolerate this error and pass the information downstream to the view synthesis and analytics module. Performing the same analysis after the game on logged data will again provide valuable insights on whether or not to make mechanical changes to the camera configuration (e.g. increasing mass of each camera or changing the mounting point onto the existing infrastructure of the stadium). A spatio-temporal analysis (e.g. Fourier transform, spectral analysis) can be used to classify which event occurred.

While the spatio-temporal pattern in the re-projection error is likely informative enough to do a status classification, it may be even more informative to observe signals of orientation changes for cameras as a function of space and time. This can reveal the specific rotational motion that the camera rig goes through. For instance, it may be that the motion is predominantly around the horizontal axes in case mechanical flexibility is greater vertically. Such data can hence provide ideas for improved camera mounting for future captures.

Some applications require that every camera in the camera array is oriented in real-time towards the action that takes place on the playing field. A control algorithm then continuously controls the servos of each camera to best direct each camera to the action. In this situation, the rotation matrix estimate must be updated in real-time for each camera. Doing status classification is more complex in this case. To classify the status, the camera orientation is continuously predicted using the servo control signal. The orientation prediction is then used to update the view matrix and the re-projection error is evaluated for the updated view matrix. External effects, such as wind, can still be classified via the re-projection error. However, it is also possible to use the pan-tilt system to correct for the error introduced by e.g. the wind. In that case, the control signal is generated to not only to direct the cameras to the action but also has a component that corrects for wind in real-time. The estimation of, and the control for, the wind effect can be done using a Kalman filter. (See e.g. "Wikipedia".)

It is emphasized that the invention is not only limited with regard to sports events but can be applied in many different applications. E.g. it can be applied in shopping-centres, market places, automotive industry etc. It is also not limited to outdoor activities but can e.g. also be useful for real estate brokers, for medical staff in a hospital etc.

With reference to the automotive industry the invention can also be useful applied for instance on a car. For instance an array of cameras can be installed at the rear bumper. These cameras may replace inside and/or outside mirrors. For a car with a camera array built-in the back of the car looking backwards the road will constantly move through the images. However, if the speed of the car is known, the road part of the images can be made stationary. The situation is then the same as a camera array looking onto a stationary sports field. A car vibration, e.g. due to a gravel road will cause small changes in camera rotation at a high temporal frequency. These can be detected, and corrected for using the propped approach. Recognition/classification of road-type (smooth highway versus gravel road) will help the real-time calibration process. If the car takes a turn into another road then an initial calibration is started. Once the car is driving on the new road, the reference frame is continuously being updated (tracked) when new road becomes visible during driving.

With reference to the tenth embodiment (claim 10), STEP F: in the context of a car, the (earlier mentioned) low-frequency event is the image of the road translating below the car and the (earlier mentioned) high-frequency event is the vibration caused by the gravel road or bumps in the road. Note that gravel roads and bumps in the road are expected to cause also relative orientation/position changes between cameras mounted into the bumper. It is expected that these relative changes are small when driving on a smooth highway. Since the car bumper will have elastic properties a calibration can be temporary off (due to a bump in the road) and then recover from itself (due to the flexible structure of the car bumper).

It is further noted that all kind of camera formations can be used, it is for instance also possible to use drones whereby each drone comprise one or more cameras. Big advantage of drones is that the mutual positions of the camera can be very easily adapted. The term "formation" is considered to be similar to the term "arrangement" or "group", etc.

Amongst numerous VR/AR-applications (with e.g. a computer or VR-goggles), the invention can also be used both in 2D or 3D applications.

The invention can generally be summarized by the following

Embodiments (1-12)

1. A method for calibrating at least one of the six-degrees-of-freedom of all or part of cameras in a formation positioned for scene capturing, the method comprising a step of initial calibration before the scene capturing, wherein the step comprises creating a reference video frame which comprises a reference image of a stationary reference object, and wherein during scene capturing the method further comprises:
   a step of further calibration wherein the position of the reference image of the stationary reference object within a captured scene video frame is compared to the position of the reference image of the stationary reference object within the reference video frame, and
   a step of adapting the at least one of the six-degrees-of-freedom of a multiple cameras of the formation if needed in order to get an improved scene capturing after the further calibration.

2. A method according to embodiment 1, wherein the "at least one" is "three".

3. A method according to embodiment 2, wherein the three degrees of freedom are yaw, roll, and pitch.

4. A method according to any previous embodiment, wherein the step of adapting is only performed when the outcome of the comparison exceeds a threshold.

5. A method according to any previous embodiment, wherein only a first part of the cameras is calibrated with the initial calibration and the further calibration and wherein the remaining second part is only calibrated with either:
   only the initial calibration and an alternative calibration, or
   only an alternative calibration, wherein the alternative calibration of a camera belonging to the second part is performed by comparing with one or more neighboring cameras of the first part.

6. A method according to embodiment 5, wherein the second part of cameras is evenly distributed along all the cameras in the formation.

7. A method according to embodiment 6, wherein the comparing with the one or more neighboring cameras is performed with interpolation and/or extrapolation techniques.

8. A method according to any previous embodiment, wherein the initial calibration is continuously repeated autonomously or at a specific event.

9. A method according to any previous embodiment, wherein the method further comprises:
   step A: analyzing which cameras of the formation have been adapted
   step B: analyzing which of the six-degrees-of-freedom of the adapted cameras have been adapted
   step C: determining the corresponding values and time stamps of the adaptations step D: recognizing multiple patterns along the formation of cameras by analyzing the information resulted from steps A, B, and C, and step E: classifying the recognized multiple patterns whereby the classification indicate different root causes for camera disturbances in one or more of the six-degrees-of-freedom of cameras in the formation.

10. A method according to embodiment 9, wherein the method further comprises:

step F: in step E taking into account multiple analyzing sessions of steps A, B, C, and D.

11. A formation of cameras positioned for scene capturing wherein at least one camera has at least one of six-degrees-of-freedom wherein the at least one camera is initially calibrated before the scene capturing, wherein during the initial calibration a reference video frame is created which comprises a reference image of a stationary reference object, and wherein during the scene capturing the at least one camera is further calibrated wherein the position of the reference image of the stationary reference object within a captured scene video frame is compared to the position of the reference image of the stationary reference object within the reference video frame, and wherein the at least one of the six-degrees-of-freedom of the at least one camera of the formation is adapted if needed for getting an improved captured scene.

12. A computer program comprising computer program code means adapted, when said computer program is run on a computer, to implement the method of any of embodiments 1 to 10.

and more particularly by the appended CLAIMS.

The mere fact that certain measures are recited in mutually different dependent claims does not indicate that a combination of these measures cannot be used to advantage.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The invention claimed is:

1. A method for calibrating at least one camera(s), wherein the at least one camera is a portion of a formation, wherein each of the at least one camera(s) comprises at least two degrees of freedom, the method comprising:
   initial calibrating before scene capturing, wherein the initial calibrating comprises creating a reference video frame, wherein the reference video frame comprises a reference image of a stationary reference object; and
   capturing a scene, the capturing comprising:
      second calibrating, wherein the second calibrating comprises comparing a position of the stationary reference object within a captured scene video frame to a position the stationary reference object within the reference video frame;
      adapting the a portion of the least two degrees of freedom so as to improve scene capturing after the second calibrating;
      analyzing which portion of the formation have been adapted;
      analyzing which portion of the least two degrees of freedom have been adapted;
      determining corresponding values and time stamps of the adaptation of the portion of the formation and the adaptation of the portion of the at least two degrees of freedom;
      recognizing at least one pattern along the formation analyzing adaptation of the portion of the formation, the adaptation of the portion of the at least two degrees of freedom and the corresponding value and timestamps; and
      classifying the at least one pattern, wherein the classifying indicates at least one root cause for camera disturbances in the formation.

2. The method as claimed in claim 1 further comprising repeating the analyzing of the portion cameras of the formation, the analyzing of the portion of the least two degrees of freedom, the determining the corresponding values and time stamps, the recognizing at least one pattern and the classifying of the at least one pattern.

3. The method as claimed in claim 1, wherein at least three cameras are calibrated.

4. The method as claimed in claim 3, wherein the at least two degrees of freedom comprise yaw, roll, and pitch.

5. The method as claimed in claim 1,
   wherein the adapting is only performed when at least one 2D image location in a set of 2D feature point image locations has changed,
   wherein the magnitude of the change exceeds a threshold.

6. The method as claimed in claim 1,
   wherein a first portion of the formation is calibrated with the initial calibration and the second calibration,
   wherein a second portion of the formation is calibrated with either, the initial calibration and a third calibration, or the third calibration,
   wherein the third calibration is performed by comparing the position of the reference image of the stationary reference object within the reference video frame of at least one neighboring camera(s) of the first portion.

7. The method as claimed in claim 6, wherein the second portion is evenly distributed within the formation.

8. The method as claimed in claim 7, wherein the comparing with the at least one neighboring camera(s) is performed with interpolation and/or extrapolation.

9. The method as claimed in claim 1, wherein the initial calibration is repeated autonomously.

10. A formation comprising:
    a plurality of cameras,
    wherein at least one camera of the formation has at least two degrees of freedom,
    wherein the at least one camera is initially calibrated before scene capturing,
    wherein a reference video frame is created during the initial calibration,
    wherein the reference video frame comprises a reference image of a stationary reference object,
    wherein the at least one camera is second calibrated that during the scene capturing,
    wherein the second calibrating comprises comparing the position of the reference image of the stationary reference object within a captured scene video frame to the position of the reference image of the stationary reference object within the reference video frame,
    wherein the at least two degrees of freedom of the at least a portion of the formation is arranged for getting an improved captured scene.

11. A computer program stored on a non-transitory medium, wherein the computer program when executed on a processor performs the method as claimed in claim 1.

12. The formation as claimed in claim 10, wherein at least three cameras are calibrated.

13. The formation as claimed in claim 3, wherein the at least two degrees of freedom comprise yaw, roll, and pitch.

14. The formation as claimed in claim 1,
wherein the arranging of the formation is only performed when at least one 2D image location in a set of 2D feature point image locations has changed,
wherein the magnitude of the change exceeds a threshold.

15. The formation as claimed in claim 1,
wherein a first portion of the formation is calibrated with the initial calibration and the second calibration,
wherein a second portion of the formation is calibrated with either, the initial calibration and a third calibration, or the third calibration,
wherein the third calibration is performed by comparing the position of the reference image of the stationary reference object within the reference video frame of at least one neighboring camera(s) of the first portion.

16. The formation as claimed in claim 6, wherein the second portion is evenly distributed within the formation.

17. The formation as claimed in claim 7, wherein the comparing with the at least one neighboring camera(s) is performed with interpolation and/or extrapolation.

18. The formation as claimed in claim 1, wherein the initial calibration is repeated autonomously.

19. The formation as claimed in claim 1, wherein the initial calibration is repeated during a specific event.

20. The method as claimed in claim 1, wherein the initial calibration is repeated during a specific event.

* * * * *